C. E. SMITH.
FEED INDICATING APPARATUS FOR BALING PRESSES.
APPLICATION FILED OCT. 30, 1919.
1,374,245.
Patented Apr. 12, 1921.
3 SHEETS—SHEET 1.
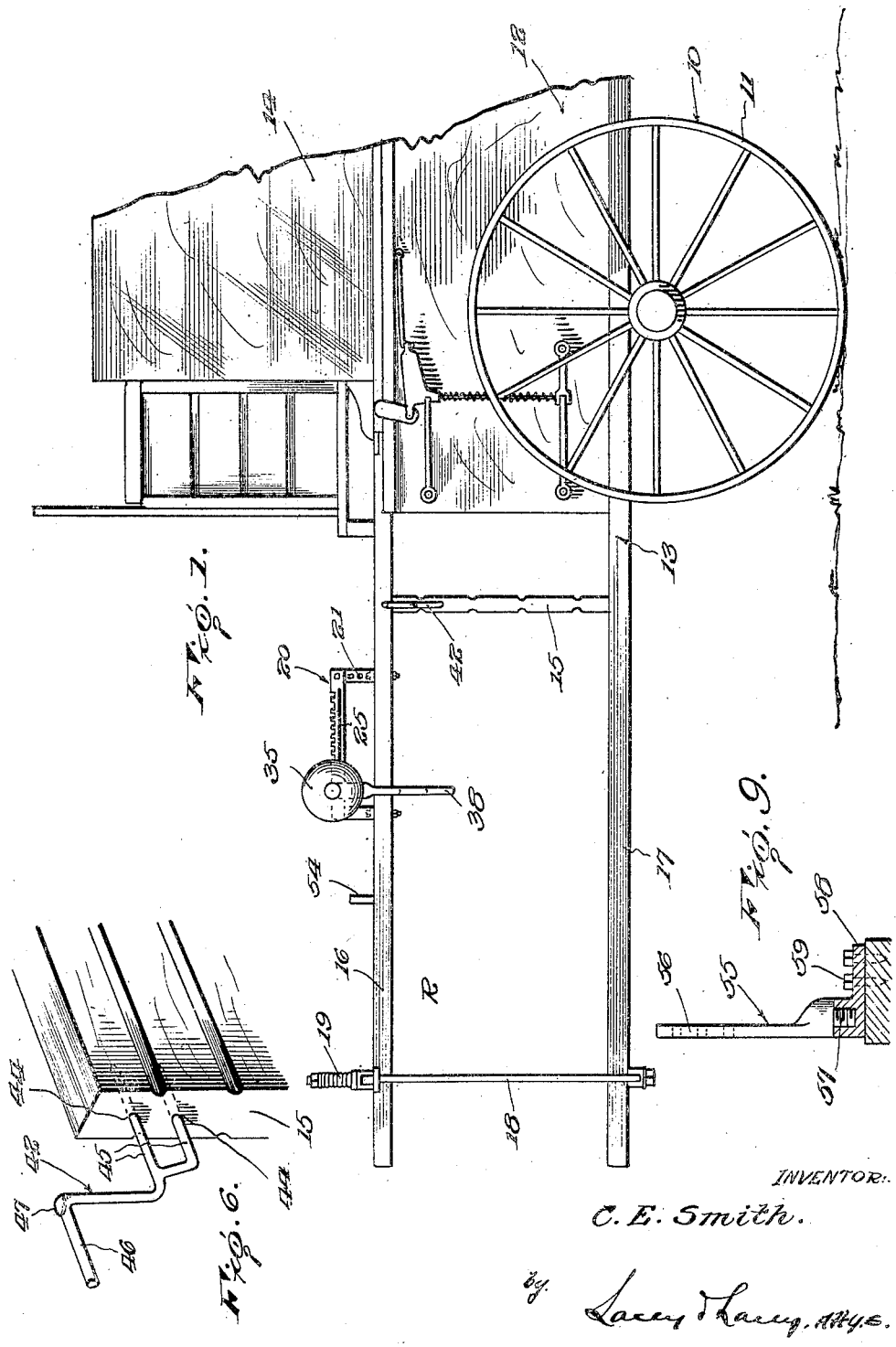
INVENTOR:
C. E. Smith.
by
Lacey & Lacey, Attys.

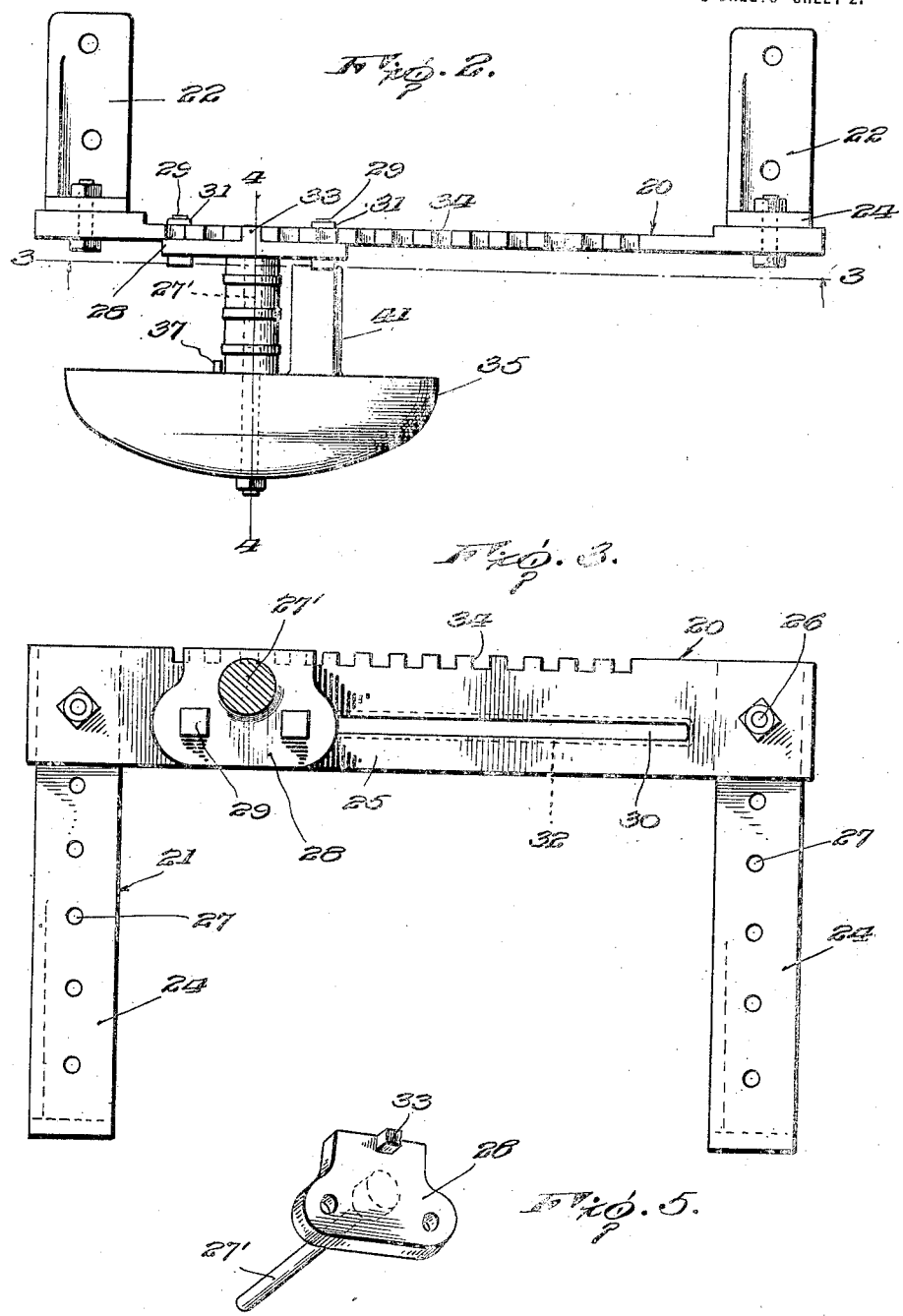

C. E. SMITH.
FEED INDICATING APPARATUS FOR BALING PRESSES.
APPLICATION FILED OCT. 30, 1919.
1,374,245. Patented Apr. 12, 1921.
3 SHEETS—SHEET 3.
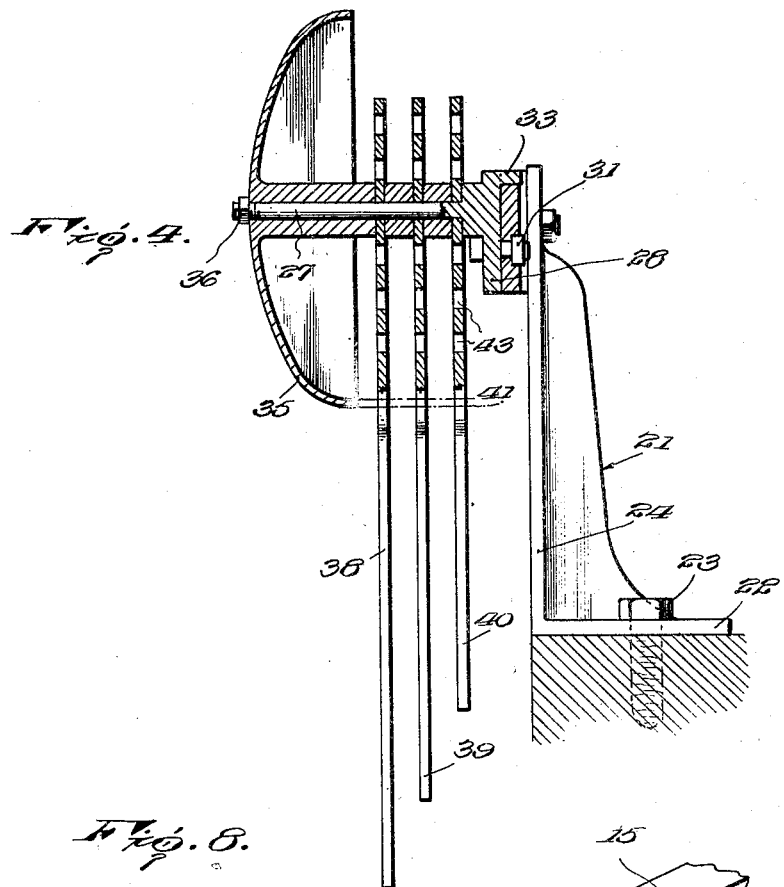
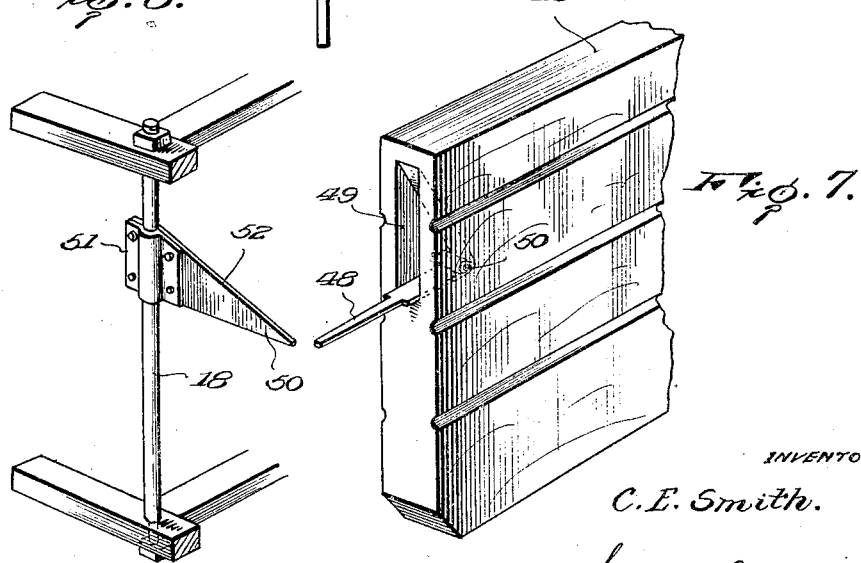
INVENTOR.
C. E. Smith.

UNITED STATES PATENT OFFICE.

CHARLES E. SMITH, OF THE DALLES, OREGON.

FEED-INDICATING APPARATUS FOR BALING-PRESSES.

1,374,245.  Specification of Letters Patent.  Patented Apr. 12, 1921.

Application filed October 30, 1919. Serial No. 334,470.

*To all whom it may concern:*

Be it known that I, CHARLES E. SMITH, a citizen of the United States, residing at The Dalles, in the county of Wasco and State of Oregon, have invented certain new and useful Improvements in Feed-Indicating Apparatus for Baling-Presses, of which the following is a specification.

This invention relates to improvements in feed indicators for baling presses.

An important object of this invention is to provide a feed indicator for baling presses having novel means for audibly indicating to the feeder of the machine the quantity of material necessary to complete the bale.

A further object of the invention is to provide an indicator attachment for baling presses having automatic means for accurately advising the operator of the press as to the quantity of material necessary to complete the bale, whereby the use of a highly skilled attendant for indicating to the feeder the quantity of material necessary to complete the bale may be dispensed with.

A further object of the invention is to provide a feed indicator for baling presses which may be readily and conveniently applied to either side of the press as working conditions may require, and which will operate with equal efficiency on either side.

A further object of the invention is to provide a feed indicator for baling presses having novel means for advising the feeder of the machine as to the exact quantity of material necessary to complete the bale, whereby all of the bales produced will be of a uniform length.

A further object of the invention is to provide a feed indicator attachment for baling presses which may be readily and accurately adjusted to operate at predetermined intervals, whereby the various signaling elements may be caused to operate according to the size of each feed.

Other objects and advantages of the invention will be apparent during the course of the following description.

In the accompanying drawings forming a part of this application and in which like numerals are employed to designate like parts throughout the same, Figure 1 is a fragmentary side elevation of a baling press having the feed indicator applied thereto, Fig. 2 is a plan view of the feed indicator detached, Fig. 3 is a vertical section taken on line 3—3 of Fig. 2, Fig. 4 is a vertical transverse section taken on line 4—4 of Fig. 2, Fig. 5 is a detail perspective of an attaching device embodied in the invention, Fig. 6 is a fragmentary perspective of a bale block having an indicator operating member attached thereto, Fig. 7 is a fragmentary perspective of a bale block having a modified form of indicator operating device applied thereto, Fig. 8 is a fragmentary perspective of the baling press frame having an elevating device adapted for coöperation with the device shown in Fig. 7.

Fig. 9 is an elevation of a modified form of bracket, parts thereof being shown in section.

In the drawings wherein for the purpose of illustration is shown a preferred embodiment of the invention, the numeral 10 generally designates a baling press which in this case is of the mobile type and is mounted on wheels 11. As is usual, the baling press includes a bale chamber 12 mounted upon a frame 13 and disposed below a feed hopper 14. During the feeding of the material, a bale block 15 is moved rearwardly between the upper and lower sides 16 and 17 respectively of the frame 13. The upper and lower sides 16 and 17 respectively of the frame are connected by a pair of tensioning rods 18 which, as illustrated in Fig. 1, are provided at their upper end portions with coil springs 19, adapted for pressing the upper bars 16 inwardly.

As clearly illustrated in Fig. 1, a signaling device 20 is mounted upon the frame 13 intermediate its ends and includes a pair of L-shaped attaching brackets 21 having horizontal arms 22 secured to the frame by attaching bolts 23 or other suitable means. The vertical arms 24 of the brackets 21 are connected to the end portions of a signal supporting bar 25 through the medium of bolts 26. The bar 25 may be arranged at the desired elevation by passing the bolts 26 through any pair of a series of openings 27 in the vertical arms 24. A horizontally arranged outwardly extending gong supporting shaft or rod 27' is secured to the front face of the bar 25 by an attaching plate 28. A pair of bolts 29 are extended through the attaching plate 28 and an elongated slot 30 in the bar 25. Nuts 31 have threaded engagement with the bolts 29 and are received within grooves 32 in the rear face of the bar and on opposite sides of slot 30, whereby accidental loosening of the nuts 31 is prevented. With reference to Figs. 3 and 4, it will be noted that the upper side of the attaching plate 28 is provided with a laterally extending lug 33 adapted to be received within recesses 34 opening out through the top of the bar 25 and securing the attaching plate 28 in adjusted position on the bar. A gong 35 is mounted on the forward end of the shaft or rod 27' and is secured in an adjusted position on the same by a nut 36 and a set screw 37.

With reference to Fig. 4 it will be noted that clapper arms 38, 39 and 40 are pivotally mounted upon the rod or shaft 27' and are adapted to engage a tongue 41 formed on the gong upon being actuated by an operating device 42. For a purpose to be more fully hereinafter described, each clapper arm is provided with a longitudinal series of spaced openings 43 adapted to receive the shaft 27'.

As indicated in detail in Fig. 6, one end of the block 15 is provided with a pair of openings 44 for detachably receiving the forks 45 of the operating device 42. An L-shaped arm 46 is extended outwardly from the forks 45 and is adapted to move rearwardly with the block 15 and engage the clappers 38, 39 and 40 simultaneously. As the bale nears the desired length, the arm 46 engages and elevates the clappers and a further lengthening of the bale causes the arm 46 to be moved rearwardly out of engagement with the shortest clapper 40 whereby said clapper 40 is permitted to fall and strike the tongue 41 of the gong. Upon the ringing of the bell the first time, by the shortest clapper 40 the feeder of the press is advised that a further feed is necessary to produce a bale of the desired length. As the block 15 moves rearwardly as the result of this further feeding, the second clapper of a greater length than the clapper 40 is released by the arm 46 and is permitted to sound the gong. This second ringing of the gong indicates to the feeder that a small quantity of material is necessary to complete a bale and he immediately proceeds to feed a very small quantity of material. The further movement of the block 15 causes the arm 46 to release the long arm 30 and allow the same to sound the gong a third time. This third ringing of the gong indicates to the feeder that the bale has reached the desired length and is therefore complete. The bale may now be wired without the exercise of unusual skill preparatory to passing the same out of the frame. Before the block 15 is free to be passed out through the rear part of the frame, the operating device 42 must be removed from the block by the wireman to permit the block to pass by the tension rods 18. The operating device 42 is of course detachably connected to the end of the follower block as soon as the same leaves the pressing or bale chamber and in the event that the forks 45 of the same do not extend the proper length into the openings 44, a knob or shoulder 47 formed on the inner portion of the L-shaped arm 46 is engaged by the clappers. The engagement of the knob 47 prevents the clappers from moving rearwardly of the L-shaped arm 46 during the rearward movement of the follower block.

Assuming that the first feed to the press lacks but a small quantity to complete the bale, the clappers 39 and 40 will be released by the arm 46 and will cause the ringing of the bell twice. As set forth above, the double ringing of the bell indicates to the feeder that but a small quantity of material is necessary to complete the bale. The length of the clappers may be regulated by passing the same through any of the desired openings 43. The shortest clapper 40 is preferably positioned at such a point that it would be impossible to make an overlength bale with a single feed. In adjusting the device, the clappers are also adjusted according to the feed capacity of the press whereby all of the bales will be of a uniform length. Further the gong and the clappers may be adjusted longitudinally of the bar 25 to correspond to the feed without changing the length of the bale. Assuming that the feeding capacity of the press is fairly large, the gong and the clappers will be positioned at the forward portion of the bar 25 whereby the feeder will be advised at an earlier period than if the feeding capacity of the press were smaller.

If desired, the signal 20 may be readily arranged on the other side of the frame by positioning the gong on the other side of the frame and partially rotating the same to position the tongue of the gong on the other side of the clappers. The gong and the clappers are positioned the desired distance above the frame by the brackets 21, whereby the wireman will not be interfered with in wiring the bale by the clappers. However, the elongated bar 25 may be secured directly to the side of the frame if desired and will operate with equal efficiency.

In the modified form of the invention illustrated in Figs. 7 and 8, the specific form of operating device 42 is dispensed with and an arm 48 is horizontally pivoted at its rear end portion within a triangular slot 49 in one end of the follower block by a pivot pin 50. When the follower block is dropped into the pressing chamber, the side walls of the chamber retain the horizontally pivoted arm 48 within the triangular slot 49 and immediately upon leaving the pressing chamber, the arm 48 is permitted to assume a horizontal position. During its rearward movement, the arm 48 engages the clappers and causes the same to function in exactly the same manner as when engaged by the arm 46. Upon passing the clappers, the laterally projecting arm 48 extends outwardly of the adjacent tensioning rod 18, and to permit the arm 48 to pass the tensioning rod 18 I have provided an elevator bar 50 secured to the tensioning rod 18 as indicated at 51. The upper side 52 of the elevator bar is inclined upwardly from its free end and serves to raise the operating arm 48 and positions the same within the slot whereby the follower block is free to pass the tensioning rod 18. It will be noted in this form of the invention, that the signaling operation is entirely automatic and it is not necessary for the wireman to remove the signal operating member after the same has engaged the clappers. When the follower block is again dropped into position, the arm 48 is again positioned within the slot 49 and does not interfere with the free movement of the follower block in the chamber. This form of the invention is, however, employed in bale presses having the vertical tensioning rods.

When the horizontally pivoted operating arm 48 is employed, the gong is attached directly to the side of the frame for bringing the clappers in line with the arm 48.

As illustrated in Fig. 1, a visual indicator 54 may be secured to the upper side of the frame intermediate the signal 20 and the tensioning rod 18 for the purpose of advising the operator when the bale is completed. The visual indicator 54 may be in the form of an upwardly extending peg or bolt and when the forked arm of the follower block registers with said visual indicator the feeder will be advised that the bale has reached the exact length desired. However, it is not necessary for the feeder to constantly observe the visual indicator 54 as the gong will be sounded as the forked arm approaches the visual indicator.

In the form of the invention illustrated in Fig. 9, the gong supporting bracket generally designated by the numeral 55 is adapted for use on baling presses having wooden frames. In this form of bracket the upright arms 56 are provided at their lower ends with screw bolts 57 adapted to be received within a screw-threaded opening in an attaching plate 58. A pair of the attaching plates 58 are permanently secured to each side of the frame by screws 59 or other fastening devices so that the uprights 56 may be changed from one side of the frame at frequent intervals without the possibility of the screw holes formed by the fastening devices 59 becoming worn out.

In the practice of the invention, the bell clappers should be equalized in weight to overcome the difference in length so that the ringing of the bell by the short clapper will be assured and at the same time the longest will ring the bell but once.

It is to be understood that the forms of the invention herewith shown and described are to be taken as preferred examples of the same and that such minor changes in arrangement and construction of parts may be made as will be desirable to apply the inventive idea involved to bale presses of various styles, provided such changes remain within the spirit of the invention and the scope of what is claimed.

Having thus described the invention, what is claimed is:

1. A feed indicator for baling presses including a signal, a plurality of signal operating members, and means to simultaneously engage and periodically release said signal operating members.

2. A feed indicator for baling presses including a signal, a plurality of depending pivoted clappers adapted for operating the signal, and means to simultaneously engage, and periodically release said pivoted clappers.

3. A feed indicator for baling presses including a support, a signal carried by said support, a plurality of pivoted clappers carried by said support and adapted to engage said signal, and means to simultaneously engage and periodically release said pivoted clappers.

4. A feed indicator for baling presses including a support, a rod secured to the support, a signal carried by the rod, a plurality of spaced pivoted clappers carried by said rod and adapted to engage said signal, and an operating device adapted to engage said clappers and periodically release the same.

5. A feed indicator for baling presses including a support, a rod adjustably secured to the support, a signal carried by the rod, a plurality of signal operating members carried by the rod, and means to simultaneously engage and periodically release said signal operating members.

6. A baling press feed indicator including a support and a rod carried by the support, a plurality of signal operating members adjustably carried by the rod and being of different lengths, and an operating device adapted to engage said signal operating members.

7. A feed indicator for baling presses including a signal, a plurality of signal operating members of different lengths, and means moving at right angles to said signal operating members for simultaneously engaging and periodically releasing the same for periodically operating the signal.

8. A feed indicator for baling presses including a bar having a longitudinally extending slot, a rod having an attaching plate in facial abutment with said bar, fastening devices extending through said slot and said bar, a signal carried by said rod, and a plurality of signal operating members carried by said rod.

9. A device of the class described including a support, a signal carried by the support, a plurality of spaced signal operating members carried by said support and having adjusting means whereby the effective length of the signal operating members may be varied, and means to operate said signal operating members.

10. A feed indicator for baling presses including an elongated bar having a plurality of notches along one edge, a rod having an attaching plate in facial abutment with said bar and provided with a lug adapted to be received within said notches, means to secure said attaching plate to said bar, a signal carried by said rod, and a plurality of signal operating members carried by said rod.

11. A feed indicator for baling presses including a support, a signal carried by the support, a plurality of pivoted clappers carried by said support, said signal being provided with a tongue adjacent said clappers and adapted to be engaged by the same, and means to operate said clappers.

12. The combination with a baling press having a follower block and a frame supporting said block, of a signal carried by the frame, and a signal operating device including a pair of parallel spaced arms and an L-shaped signal engaging member extending upwardly from said arms, one end of said block being provided with a pair of vertically spaced openings receiving said arms.

13. A feed indicator for baling presses including a pair of brackets having spaced openings, an elongated bar having its end portions provided with bolts extending through certain of said openings, one longitudinal edge portion of said bar being formed with notches, a rod having an attaching plate provided with a lug received within one of said notches, a signal carried by said rod, and signal operating means carried by said rod.

14. A feed indicating apparatus for baling presses including a support, a signal carried by the support, and a plurality of independently adjustable signal operating devices carried by said support.

15. The combination with a baling press having a follower block and a frame supporting the block, of a signal carried by the frame and a signal operating device including a pair of spaced parallel arms detachably connected with the follower block and an L-shaped signal operating arm, the inner portion of said L-shaped signal operating arm being formed with a shoulder.

16. A feed indicator for baling presses including a signal, and a swingingly supported clapper arranged adjacent said signal, said signal being provided with a tongue traversing the path of travel of said clapper and adapted to be engaged by the same.

17. A feed indicator for baling presses including a signal, a swingingly supported clapper arranged adjacent said signal, said signal being provided with a tongue traversing the path of travel of said clapper and adapted to be engaged by the same, and operating means for said clapper.

In testimony whereof I affix my signature.

CHARLES E. SMITH. [L. S.]